United States Patent [19]

Kiss

[11] Patent Number: 4,952,356
[45] Date of Patent: Aug. 28, 1990

[54] PROCESS FOR THE HOT PRESS MOULDING OF MOULDED ARTICLES

[75] Inventor: Gunter H. Kiss, Sontra, Fed. Rep. of Germany

[73] Assignee: Societe Generale, Paris, France

[21] Appl. No.: 210,870

[22] Filed: Jun. 24, 1988

[30] Foreign Application Priority Data

Jun. 25, 1987 [DE] Fed. Rep. of Germany ....... 3721663

[51] Int. Cl.$^5$ .................. B29C 43/04; B29C 43/18
[52] U.S. Cl. ............................ 264/113; 264/112; 264/119; 264/137; 264/258; 156/62.2; 156/242
[58] Field of Search ............. 264/83, 112, 113, 258, 264/109, 119, 137; 156/62.2, 242

[56] References Cited

U.S. PATENT DOCUMENTS

| | | | |
|---|---|---|---|
| 3,846,219 | 11/1974 | Kunz | 264/112 |
| 4,378,265 | 3/1983 | Kiss | 264/113 |
| 4,432,716 | 2/1984 | Kiss | 264/103 |
| 4,503,115 | 3/1985 | Hemels | 264/112 |
| 4,521,477 | 6/1985 | Kiss | 264/113 |
| 4,655,861 | 4/1987 | Kiss | 264/112 |

Primary Examiner—Jay H. Woo
Assistant Examiner—Jeremiah F. Durkin, II
Attorney, Agent, or Firm—Marshall & Melhorn

[57] ABSTRACT

A process for the hot press moulding of moulded articles, such as the internal linings of motor vehicles or the like is described, in which planar blanks of tangled fibre mat fleece mixed with binders, using at least one mould, are permanently deformed in a multidimensional moulding process after evaporating on the mat fleece. A stabilizing support is introduced during the deformation process on at least one side between the shaping surface of the mould and the mat fleece. It is in the form of a fibrous sandwich layer which is substantially elongation-free in the surface direction at ambient temperature, but is plastically deformable within the hot press mould under the action of heat. With and/or immediately after the moulding process, said stabilization support becomes a substantially elongation-free, inflexible covering. The geometry of the flexible stabilizing support is to be made to coincide with that of the mat fleece blank to be deformed.

10 Claims, 1 Drawing Sheet

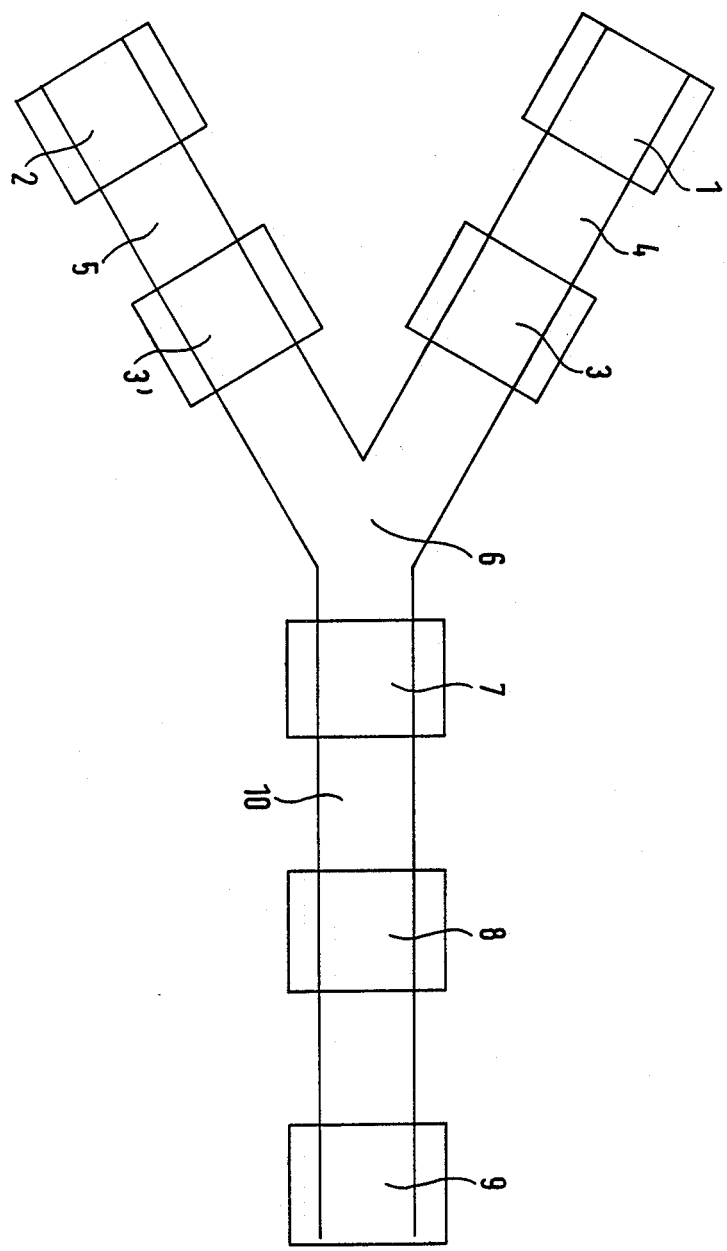

PROCESS FOR THE HOT PRESS MOULDING OF MOULDED ARTICLES

BACKGROUND OF THE INVENTION

The invention relates to a process for the hot press moulding of moulded articles, such as internal linings of motor vehicles or the like, in which planar blanks of tangled fibre mat fleece mixed with binder are permanently shaped with at least one mould, in a multidimensional moulding process following the steam treating of the mat fleece and in which for the shaping process a stabilizing support is introduced at least on one side between the shaping surface of the mould and the mat fleece.

Research concerning the manufacturability and characteristics of simple chip moulded parts, in which the blanks are shaped to give angular multidimensional bodies, particularly where relatively extensive deformations are desired, have revealed that displacements of the chip structure are not uniformly distributed over the entire cross-section during the shaping or deforming process, i.e. there are points of greater thinning and/or greater thickening. In order to eliminate such shaping disadvantages which considerably reduce the quality of the article to be moulded and possibly even make it unsuitable for use, it is already known to cold preshape the blank in a pressing means and to associate with it an elastic support surface, which as a stabilizing support leads to a better distribution of the deforming strain over the chip structure. In this connection the stabilizing support was constituted by a rubber covering (Klauditz, Stegmann, Kratz, Brunswick Technical University, Bericht 90/1965, Westdeutscher Verlag Cologne and Opladen 1965).

The support of the blank which is to be moulded with a press mould using an elastic support surface is the general prerequisite for producing moulded articles with relatively marked three-dimensional deformations when using a material having limited compressability and stretchability, such as a loose chip structure or a binder-mixed tangled fibre fleece.

The industrial transfer of this known process to the continuous moulding of fibrous fleece material to moulded articles with maximum speed characteristics has revealed that the rubber coverings are unsuitable for permanent operating conditions, because, as a result of their relatively smooth surface, they do not ensure an adequate transfer of the deformation forces which occur to the fibrous fleece or non-woven fabric and in the case of extension or elongation distribution of the rubber covering does not or does not always correspond to what is required in the finished part.

In a known apparatus in which the shaping partial surfaces of at least one mould half of the hot press mould act jointly on at least one elasticly deformable, through intermediate layer in such a way that the shaping forces are transferred throuqh said intermediate layer to the non-woven fabric, assistance is provided in that the elastically deformable intermediate layer is wholly or partly roughened on the surface in contact with the nonwoven fabric, or has a surface structure such as is e.g. obtained in the case of fabrics formed from elastic threads of appropriate strength and mesh width. Thus, the transfer of the elongation movements of the elastic intermediate layer to the non-woven fabric during the closing of the mould gives an ideal frictional engagement between the elastic intermediate layer and the tangled fibre fleece or non-woven fabric, both at points with relatively strong deformation and also over the entire surface of the mould (German Pat. No. 27 59 279).

However, it has been found that in the mass production of moulded articles, such as e.g. those used for the internal lining of motor vehicles, there is a relatively early fatigue to the intermediate layer material, so that it has to be replaced and thrown away, particularly if cloth is used as the intermediate layer.

Finally, an apparatus for producing moulded articles from binder-mixed, particulate materials is known, which makes use of a substantially elongation-free stabilizing support in the surface direction (DE-AS 27 13 527). Also in conjunction with this apparatus, the special difficulties when using a stabilizing support were recognized, particularly in that in the case of multidimensional deforming processes during the hot pressing process the material displacement is difficult to absorb, if the materials to be pressed are not able to adequately take up the tensile forces, such as is the case with blanks from mat fleeces of the type of interest here. This problem can only be obviated to a limited extent by a substantially elongation-free stabilizing support in the surface direction and it is particularly disadvantageous that such stabilizing supports, as a result of their freedom from elongation, undergo such a marked deformation even when used once, that they become unusable for a further pressing process even after a very short period of use.

Since for handling reasons these stabilizing supports must be given a relatively stable construction, there short life makes production much more expensive. A further disadvantage of stabilizing supports is that, in order to ensure a good tension transfer to the mat fleece to be shaped, they must have a corresponding surface structure (cloth,burls). Thus, as a deforming aid, they can only be used for deformation and shaping, but not for any other purpose. Prior to the final hot press moulding and compression of the fibre mats they must be removed, because otherwise they would give rise to corresponding marks on the moulded article surface and these are generally not desired.

Another possibility of stabilizing the shaping process in the case of tangled fibre fleeces can be the incorporation into the fleece of a firm fabric. However, this also results in important disadvantages. The fabric embedded in the fibre fleece mats is only reached by the tensile forces of the deformation if they have already been transferred to the fibrous material by the shaping mould surfaces. This generally leads to premature damage in the structure of the fibre mats before the stabilizing fabric insert can come into action.

Tests carried out with more suitable stabilizing supports as an intermediate layer during the deformation process between the shaping surface of the hot press mould and the fibrous material to be pressed have also lead to disadvantages due to the marked stressing due to the male mould pressure, particularly when producing highly curved, three-dimensional moulded articles. As a result the stabilizing supports are rendered unusable after a very short period of time, which is unacceptable for mass production purposes, so that they frequently had to be replaced.

SUMMARY OF THE INVENTION

The present invention is based on the finding that stabilizing supports constitute aids in the pressing of fibre fleece or non-woven fabric material, only absorbing limited tensile forces, to spatial moulding structures. Thus, it is a question of using these disposable cloths more appropriately than hitherto and to integrate same into the manufacturing process of moulded articles of the present type.

For stabilizing the shaping process, it is merely necessary to use aids which, although tension-proof with respect to the fibrous mat, from the absolute stand point can have a much lower strength than the prior art stabilizing supports. Thus, the invention is directed at providing stabilizing supports which, with minimum material expenditure and correspondingly low costs, are only usable once and preferably as a finishing surface material can optionally be left behind on the completed moulding.

Due to the fact that the stabilizing surfaces are so firmly connected to the surfaces of the non-woven fabric to be pressed that during the deforming process the necessary tensile forces can be adequately absorbed by said support, without there being any reduction in the free displaceability of the fibrous material within the fibre mat and due to the fact that the stabilizing support is chosen in such a way that it can be optionally left behind on the surface of the thee-dimensionally deformed moulded article, the hitherto occurring waste due to deformed and therefore unusable stabilizing supports is obviated. It is also particularly advantageous to make the characteristics of the stabilizing supports such from the outset that, as has e.g. only been possible hitherto with additional coatings, they can improve or finish the surface of the moulded article to a significant extent and give the latter positive surface characteristics over and beyond the actual press moulding process, quite apart from their function as a stabilizing support.

BRIEF DESCRIPTION OF THE DRAWINGS

The FIGURE is a schematic representation of a process embodying the features of the present invention.

DETAILED DESCRIPTION OF THE PREFERRED EMBODIMENT

A basic concept of the invention is that the absorption of tensile and compressive forces by the stabilizing support necessary for the actual deformation process only occur to said support during the actual deformation process. Otherwise the stabilizing support acts in the same way as any other cloth, non-woven fabric or fibrous layer under normal conditions and standard environmental influences.

It is particularly advantageous that the remaining of the stabilizing supports on the moulded article makes it possible to improve the final pressing process, which in the prior art was only possible through limitedly reusable stabilizing supports, due to the deterioration of the structure of the moulded article surfaces. This advantage can be most readily used if the stabilizing supports only have a limited thickness and no particularly marked surface structure, unlike in the case of the coarse cloths used in the prior art. They transfer the tensile forces to the mat mainly by frictional engagement. If use is made of stabilizing supports which have little or no surface structures, then a special measure must be taken for transferring tension. Due to the fact that the stabilizing supports are joined to the fibrous fleece mat by curing using thermosetting plastics, the frictional engagement of structured stabilizing supports can be replaced by adhesion. Due to the adhesion between the fibrous mat and the stabilizing support due to the cured thermosetting plastics, so that adhesion is maintained in the warm state during damping and deformation, it is possible to use unstructured stabilizing supports. These measures also constitute a significant improvement to the prior art. If e.g. for the intended use fibrous mat materials are used, whose surface is covered by different types of layers, then said junction is generally brought about by the same binder systems heat-softened by other aids. It is particularly important that the inventive stabilizing supports largely retain their characteristics, such as tensile strength, low elongation in the surface direction and flexibility, both during damping and during shaping. In conjunction with the fibre displaceability in the mat material brought about by damping, this leads to the shaping characteristics being improved to such an extent that the hitherto necessary preshaping process can be rendered superfluous. This is also due to the stabilizing supports, constructed as "disposable cloths" being left behind on the moulded article. As the stabilizing supports are arranged on the surfaces of the fibrous mats, they initially absorb the tensile forces linked with the shaping process and transfer the same to the mat material via the heat-proof adhesive layer. Thus, the disadvantages of a stabilizing fabric in the interior of the mat are avoided.

The inventive process can be realised with random tangled fibre mat blanks. However, it is particularly advantageous if the tangled fibre mat blank comprises fibres which are softenable by a steam treatment and which consequently swell. The known thickness increase accompanying this measure (loosening of the mat state), as a result of the increased fibre elasticity and the improved fibre displaceability, brings about a mat state of great deformability and simultaneously low tensile strength. The stabilizing support, which is substantially non-elongated in the surface direction can, particularly if applied to both sides of the fibre mat, be obtained particularly easily, so that further costs are saved. Such light stabilizing supports simultaneously have high flexibility, so that they can be readily adapted to the necessary shape changes. The heat-proof union with the fibre mat, which cannot be detached by evaporation, ensures that tensile forces which occur can be absorbed without any difficulty and also transferred. It is also advantageous if in per se known manner the thickness of the mat blank, prior to shaping, is a multiple of the final thickness of the pressed moulded article, because the looser initial structure of the initially slightly compressed fibre mat favours the shape adaptation by fibre displaceability.

It is also unimportant at what time prior to steam treating and deforming, the stabilizing support is connected in heat-proof-adhesive manner to the mat. An important aid and therefore an advantageous further development of the art is provided if the adhesion of the stabilizing support to the tangled fibre blank is a heat-proof self-adhesion like adhesive strips or self-adhesive labels. In this case, a prefabricated stabilizing support blank can be joined in production-advantageous manner to the tangled fibre mat blank, e.g. by pressure application using calender rolls, prior to damping and prior to deformation. It can be advantageous if the individual components forming the crosslinkable adhesive system for imparting adhesion are so distributed over the stabilizing support and the fibre mat that crosslinking is only possible after the combining of these two components. This simultaneously makes it possible to produce storable semifinished products and consequently to simplify the production sequence.

The tensile forces initially absorbed by the stabilizing support must be transferred to the non-woven fabric and appropriately distributed. It is particularly advantageous if the heat-proof adhesive is distributed between the non-woven fabric blank and the stabilizing support over several layers of said fabric, because in this case there is no raising of the upper fibre layer due to the tension occurring during deformation and the stabilizing effect on the shaping process is additionally optimized.

Moulded articles formed from pressed fibrous fleece mats have the particular advantage of being gas-permeable. Apart from the effects on the ambient climatic conditions (moisture exchange), the gas permeability of the finished moulded article facilitates its subsequent finishing by vacuum coating or foaming the visible surfaces; such processes being widely used on an industrial scale. It is therefore particularly advantageous if stabilizing supports of the above-described type left behind on the moulded article impair said gas permeability of the moulded articles to the minimum by themselves being made from gas-permeable materials. This can e.g. be brought about in that they are made from fibrous fleeces, whose fibres are very strong and whose structure is prestrengthened so as to absorb tensile forces and have limited elongation by precondensed thermosetting binders, independently of the adhesives bringing about the heatproof adhesion between the stabilizing support and the fibrous fleece mat. As a result of this measure the gas permeability of the stabilizing supports is maintained, the precondensed resins remain adhering to the fibres during hot press moulding and the meshes of the fleecelike stabilizing support are not clogged. Simultaneously the stabilizing support retains its necessary tensile strength and limited elongation during damping and shaping due to the precondensed and therefore prestrengthened thermosetting plastics. In addition, the thermosetting resin components of the stabilizing supports cured following hot pressing contribute to the strength and surface quality of the moulded article. For the reasons given hereinbefore, the thickness of the stabilizing support can be very small compared with that of the fibrous mat. Apart from the cost-saving material reduction, this leads to the additional advantage that possibly occurring slight folding in the deformation aid and which sometimes are unavoidable in practise, can be pressed out to such an extent that they do not impair the surface quality of the moulded article—this also being an important prerequisite for the stabilizing supports remaining on the surface of the moulded articles.

The invention is described in greater detail hereinafter relative to the Figure, which constitutes an exemplified block diagram of the present process.

There are storage means for the stabilizing support on the one hand and for the fibrous fleece or non-woven fabric on the other. The storage means 1 for the stabilizing support can e.g. comprise alternately usable endless rolls for the continuous process sequence and on same is stored a woven or non-woven stabilizing support, which is substantially free from elongation at ambient temperature and which is in the form of a belt-like material. However, it can also be a spraying plant for stabilizing material to be sprayed onto the conveyor 4 and subsequently in a gluing station 3 it is formed into a web-like fibrous union. The stabilizing support material is a plastic permitting no permanent deformation at ambient temperature, whilst it is elastically deformable within the hot press mould under the temperature conditions.

By means of a separate second conveyor 5, from a fibrous fleece storage means 2 it is supplied in the form of an endless web, or e.g. from a stack in the form of a blank and after optionally interposing a gluing station 3', to a combining means 6, in which the stabilizing support and non-woven fabric are brought into a congruent superimposed position. If the non-woven fabric is to be provided on both sides with a stabilizing support, then along side the conveyor 4 with storage means 1 is provided a further, approximately parallel and not shown conveyor with a further storage means for the stabilizing support, so that the combination leads to a sandwich arrangement, which receives a fibrous fabric layer between two stabilizing supports.

This, or as described hereinbefore, the two-layer arrangement is now supplied to the blank 7, i.e. a station where cutting takes place to the blank required for the moulded article to be subsequently produced. It is obviously also possible for the present process sequence not to place blank 7 in a common station for the stabilizing support and the non-woven fabric and instead provide it separately for the stabilizing support in the vicinity of conveyor 4 and for the non-woven fabric in the vicinity of conveyor 5. After the combining means 6, it is necessary to ensure a precise alignment of the two separate blanks in the superimposed position within an adhesion station, where an at least temporary, non-slip joining together of the two layers is performed, which can e.g. be ensured by the aforementioned gluing of one or other surface.

Along conveying means 10 the blanks are then supplied to the hot press mould 8, where the multilayer arrangement is moulded to the desired moulded article. After leaving mould 8, the moulded part passes into a final processing or transportation station 9 for conveying e.g. to a store or for dispatch.

The actual hot press moulding operation can take place in known manner in one or two stages. It is particularly advantageous for the production of internal linings for motor vehicles to use non-woven fabrics or blanks of the same made from cellulose or lignocellulose. The preparation of the self-adhesive surface between the nonwoven fabric and the stabilizing support can be carried out in that in one or other gluing station 3 or 3' at least one side of the fabric and/or support is constructed as an adhesive base, to which is applied a thermosetting crosslinkable binder and it is also possible to add such a binder to the fibrous material at the time of mat production, the characteristics thereof being chosen in such a way that it at least partly crosslinks at the mat production temperature, so that a stable adhesive base not influenced by damping can be preselected for the stabilizing support with characteristics desired for specific temperature ranges. For the actual stabilizing support use is made of a material and/or binder which does not crosslink prior to hot shaping, because otherwise the desired shape change characteristics which are essential for the actual shaping process would not occur. The stabilizing support naturally remains on the moulded article during final moulding. The adhesive between the stabilizing support and the non-woven fabric is advantageously such that at least temporarily during moulding it leads to a firm union between the layers between 60° and 150° C. As a function of the desired surface characteristics of the end product, the union between the stabilizing support and the fibrous material can be such that after final moulding a removal of the stabilizing support is not possible, or is easily possible in the manner of self-adhesive, removable labels or adhesive strips.

According to a preferred procedure the penetration depth is such that it amounts to more than 5% of the thickness of the non-woven fabric.

I claim:

1. A process for preparing molded articles from binder-impregnated fibrous mats, comprising the steps of:
    (A) providing a binder-impregnated fibrous mat, having a surface;
    (B) providing a stabilizing support in superposed relationship to the surface of the binder-impregnated fibrous mat, the stabilizing support comprising a fibrous sheet material having opposing surfaces, which is substantially dimensionally stable in directions tangential to the opposing surfaces and flexible in directions normal to the opposing surfaces, the stabilizing support including a curable thermosetting resin;
    (C) adhering the stabilizing support to the surface of the binder-impregnated fibrous mat;
    (D) steam treating the binder-impregnated fibrous mat and adhered stabilizing support; and
    (E) press molding the binder-impregnated fibrous mat and adhered stabilizing support, whereby the stabilizing support thermosetting resin cures to form a substantially dimensionally stable, inflexible covering on the formed binder-impregnated fibrous mat.

2. The process, according to claim 1, wherein the binder-impregnated fibrous mat comprises lignocellulose fibers, the fibrous mat having a density and a dimensional stability in directions tangential to the surface less than the stabilizing support.

3. The process, according to claim 1, wherein the stabilizing support comprises a tangled fiber fleece layer having a thickness substantially less than the thickness of the binder-impregnated fibrous mat.

4. The process, according to claim 1, wherein the stabilizing support is prepared by randomly depositing high-strength fiber threads onto a forming surface, impregnating the randomly deposited fiber threads with a thermosetting binder, and curing the thermosetting binder at a temperature of 105° C.

5. The process, according to claim 1, wherein the formed stabilizing support is air-permeable.

6. The process, according to claim 1, wherein the step of adhering the stabilizing support to the surface of the binder-impregnated fibrous mat, comprises interposing and at least partially curing a layer of a thermosetting adhesive therebetween.

7. The process, according to claim 6, wherein the layer of thermosetting adhesive is in the form of a sheet, curable at a temperature from 60° C. to 150° C.

8. The process, according to claim 6, wherein the thermosetting adhesive is a two component adhesive, the first component is applied to the surface of the binder-impregnated fibrous mat and the second component is applied to the stabilizing support, and thereafter the binder-impregnated fibrous mat and stabilizing support ar brought into contact, whereby the first component and the second component of the adhesive react and cure in situ.

9. The process, according to claim 6, wherein the thermosetting adhesive penetrates the binder-impregnated fibrous mat to a depth greater than 5% of a thickness of the fibrous mat.

10. The process, according to claim 1, wherein the binder-impregnated fibrous mat includes two opposed surfaces, for the adhering of respective stabilizing supports thereto, to prepare substantially dimensionally stable, inflexible, opposed coverings on the formed binder-impregnated fibrous mat.

* * * * *